United States Patent
Shah et al.

(10) Patent No.: US 10,738,914 B2
(45) Date of Patent: Aug. 11, 2020

(54) DISPLACEMENT DECOUPLING ARRANGEMENT FOR PIPING SYSTEMS

(71) Applicants: INSTITUTE FOR PLASMA RESEARCH, Gandhinagar (IN); INOX INDIA PVT. LTD., Vadodara (IN)

(72) Inventors: Nitin D. Shah, Ahmedabad (IN); Ketan D. Choukekar, Ahmedabad (IN); Mohit Jadon, Ahmedabad (IN); Uday Kumar, Ahmedabad (IN); Biswanath Sarkar, Ahmedabad (IN); Hitensinh B. Vaghela, Ahmedabad (IN); Rajkumar L. Panjwani, Vadodara (IN); Bhumika H. Joshi, Vadodara (IN); Hardik R. Vyas, Vadodara (IN); Vijay S. Gehani, Vadodara (IN); Hiren V. Kanzaria, Vadodara (IN); Darshan M. Dodiya, Vadodara (IN); Dhara G. Prajapati, Vadodara (IN); Manan R. Thekdi, Vadodara (IN)

(73) Assignees: INSTITUTE FOR PLASMA RESEARCH (IN); INOX INDIA PVT. LTD. (IN)

( * ) Notice: Subject to any disclaimer, the term of this patent is extended or adjusted under 35 U.S.C. 154(b) by 34 days.

(21) Appl. No.: 16/179,035

(22) Filed: Nov. 2, 2018

(65) Prior Publication Data
US 2020/0041043 A1    Feb. 6, 2020

(30) Foreign Application Priority Data
Aug. 3, 2018 (IN) .............................. 201821029220

(51) Int. Cl.
*F16L 3/205* (2006.01)
*F16L 3/04* (2006.01)
(Continued)

(52) U.S. Cl.
CPC .................. *F16L 3/205* (2013.01); *F16L 3/04* (2013.01); *F16L 3/2053* (2013.01);
(Continued)

(58) Field of Classification Search
CPC . F16L 3/205; F16L 3/04; F16L 3/2053; F16L 3/2056; F16L 3/227; F16L 3/221
See application file for complete search history.

(56) References Cited

U.S. PATENT DOCUMENTS 2,756,014 A * 7/1956 Leibfried .............. F16L 3/2056
                                                    248/571
4,069,992 A * 1/1978 Lada ...................... F16F 1/041
                                                    248/544
(Continued)

FOREIGN PATENT DOCUMENTS

EP          439272 A  *  7/1991
FR         2480884 A  * 10/1981
JP      2000356295 A  * 12/2000

*Primary Examiner* — Eret C McNichols
(74) *Attorney, Agent, or Firm* — Fox Rothschild LLP

(57) ABSTRACT

A sliding pipe supporting arrangement (2) adapted to receive and support at least one pipe or jacketed pipe assembly comprising main support means (9) comprising at least one opening to support a pipe. The arrangement further comprises an assembly of spring arrangement (6) and ball transfer unit (7), coupled to the main support means so as to isolate differential displacement in lateral and vertical direction of the pipe. The assembly unit comprises a top plate (3), middle plate (4) and a bottom plate (5). The spring arrangement further comprises a plurality of springs positioned in between the top plate (3) and the middle plate (4) facilitating the vertical displacement of the pipe. The ball transfer unit (4) also comprises plural rollers positioned between the bottom plate (4) and middle plate (5) facilitating lateral displacement of the pipe and an expansion joint arrangement
(Continued)

(8) placed in between pipe lengths of a pipe to attenuate the axial displacement of the said pipe.

4 Claims, 12 Drawing Sheets

(51) Int. Cl.
 *F16L 3/22* (2006.01)
 *F16L 3/227* (2006.01)
(52) U.S. Cl.
 CPC ............. *F16L 3/2056* (2013.01); *F16L 3/221* (2013.01); *F16L 3/227* (2013.01)

(56) References Cited

U.S. PATENT DOCUMENTS

| | | | | | |
|---|---|---|---|---|---|
| 4,554,767 | A | * | 11/1985 | Ikonomou | ............... E02D 27/34 52/167.9 |
| 4,576,356 | A | * | 3/1986 | Kucera | ................ F16L 3/2053 188/380 |
| 5,009,386 | A | * | 4/1991 | Berger | .................. F16L 3/2053 248/59 |
| 5,740,216 | A | * | 4/1998 | Morishita | ................ G21C 9/04 376/285 |
| 2016/0340859 | A1 | * | 11/2016 | Lisin | ....................... F16L 57/06 |
| 2019/0003614 | A1 | * | 1/2019 | Koenig | .................. F16L 3/105 |
| 2019/0135202 | A1 | * | 5/2019 | Korson | .................. B60D 1/64 |

* cited by examiner

US 10,738,914 B2

DISPLACEMENT DECOUPLING ARRANGEMENT FOR PIPING SYSTEMS

FIELD OF INVENTION

The present invention in general relates to the field of piping systems, and in particular to a displacement decoupling arrangement for a piping system.

BACKGROUND

General piping systems and unidirectional movable piping supports of conventional piping systems are generally designed for seismic events as per the local geographical conditions, with fixed supports, or movable support absorbing displacements in just one direction.

The conventional seismic decoupling solutions are for the bare process pipes or buildings structures. A pipe running from an equipment A which is directly connected to ground to another equipment B, is connected to ground via seismic pads. There are differential movements in multiple directions between equipment A and equipment B during the seismic events. Such a movement can cause failure of the piping system if sufficient flexibility in multiple directions is not provided in the piping system.

When two adjacent buildings or structures have different responses to seismic event, the rigid piping connecting the two buildings or structures demands sufficient flexibility in multiple directions so that pipes do not break during the seismic event due to large differential movements of buildings or structures it is connected with. Seismic events pose even more complex problems to jacketed piping with vacuum in annular space and fluid at cryogenic temperatures in inner pipe.

Accordingly, there is a need for a displacement decoupling arrangement in the supporting structure of pipes which helps to achieve safe design of jacketed cryogenic piping arrangement for large differential displacements in multiple directions during seismic events.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An object of the present invention is to provide a sliding pipe supporting arrangement adapted to receive and support at least one pipe or jacketed pipe assembly.

Another object of the present invention is to provide a piping system for jacketed cryogenic piping arrangement comprising a sliding pipe supporting arrangement.

In accordance with an aspect of the present disclosure, is to provide a displacement decoupling arrangement for piping systems which is a sliding pipe supporting arrangement adapted to receive and support at least one pipe or pipe assembly, said arrangement comprising main support means comprising at least one opening to support a pipe, an assembly of spring arrangement and ball transfer unit, mechanically coupled to the main support means so as to isolate differential displacement in lateral (Y-direction) and vertical direction (Z-direction) of the said pipe, said assembly unit comprising a top plate, middle plate and a bottom plate, wherein the spring arrangement comprises a plurality of springs substantially positioned in between the top plate and the middle plate facilitating the vertical displacement of the said pipe, and wherein the ball transfer unit comprises plural rollers mechanically positioned between the bottom plate and middle plate facilitating lateral displacement of the said pipe and an expansion joint arrangement operably placed in between pipe lengths of a pipe to attenuate the axial displacement (X-direction) of the said pipe.

In another aspect of the present invention, is to provide a piping system for jacketed cryogenic piping arrangement comprising a sliding pipe supporting arrangement and a fixed pipe supporting arrangement, adapted to receive and support two vacuum jacketed cryolines and one bare pipe, wherein the sliding pipe supporting arrangement operates at very low temperatures, where the outer jacket pipe temperature of the cryoline decrease up to approximately −172° C. due to loss of insulation vacuum of the said cryoline. The sliding pipe supporting arrangement operates under SL-2 type seismic event, having an acceleration of 8.6G in the vertical direction (Z-direction), 2.1G and 5G in the horizontal direction (X and Y directions).

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features and advantages of the embodiments of the present disclosure will be more apparent in the following description taken in conjunction with the accompanying drawings, in which.

Figure 5A:
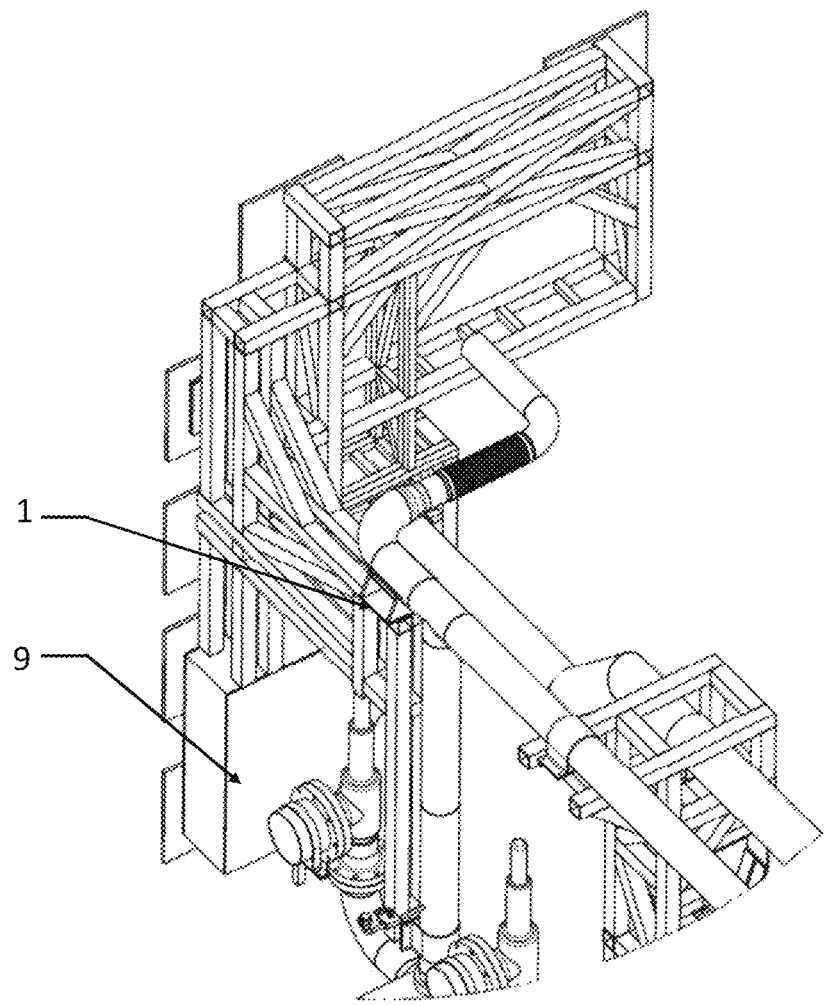
Figure 5B:
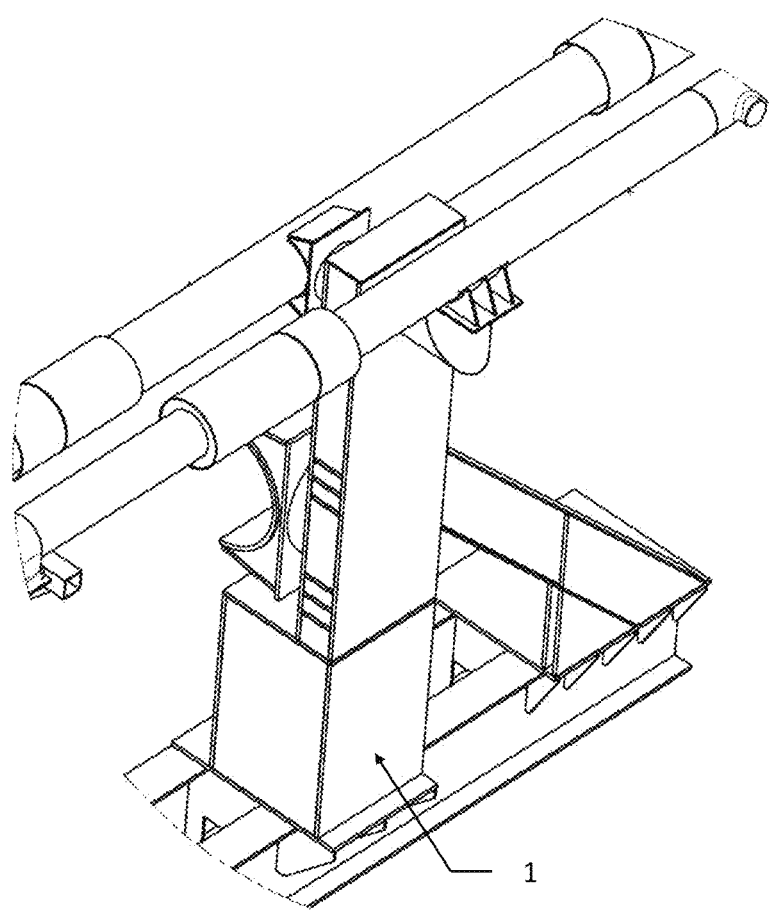
Figure 6A:
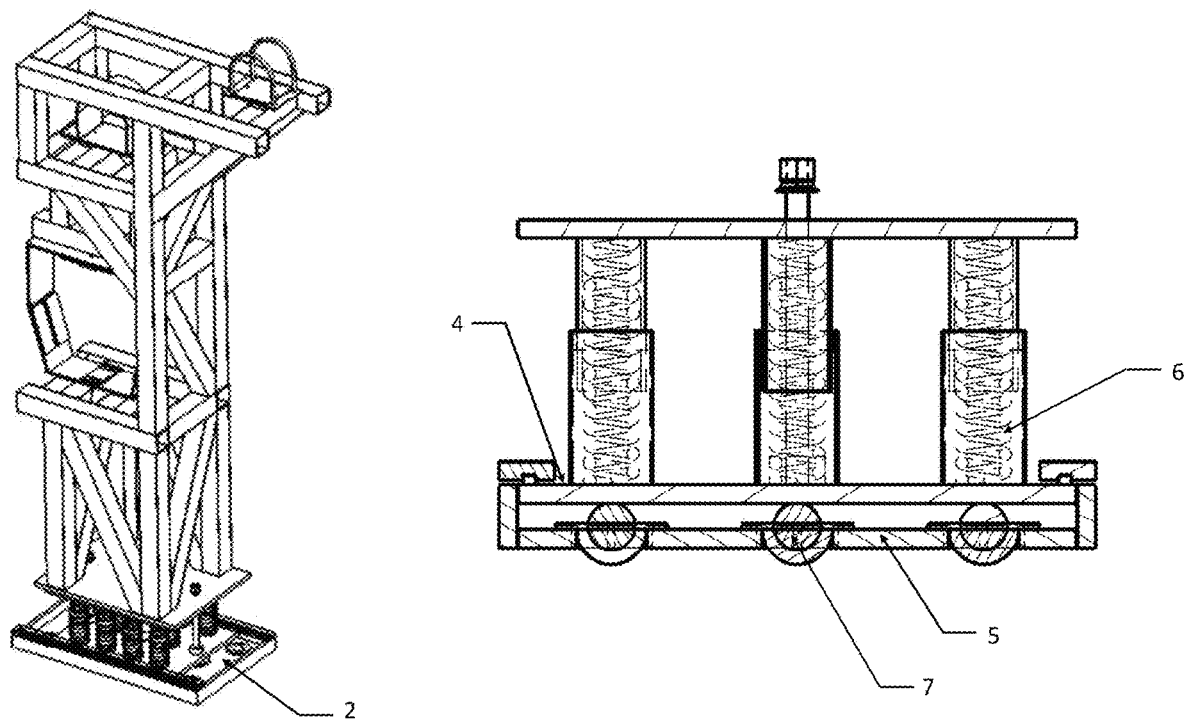
Figure 6B:
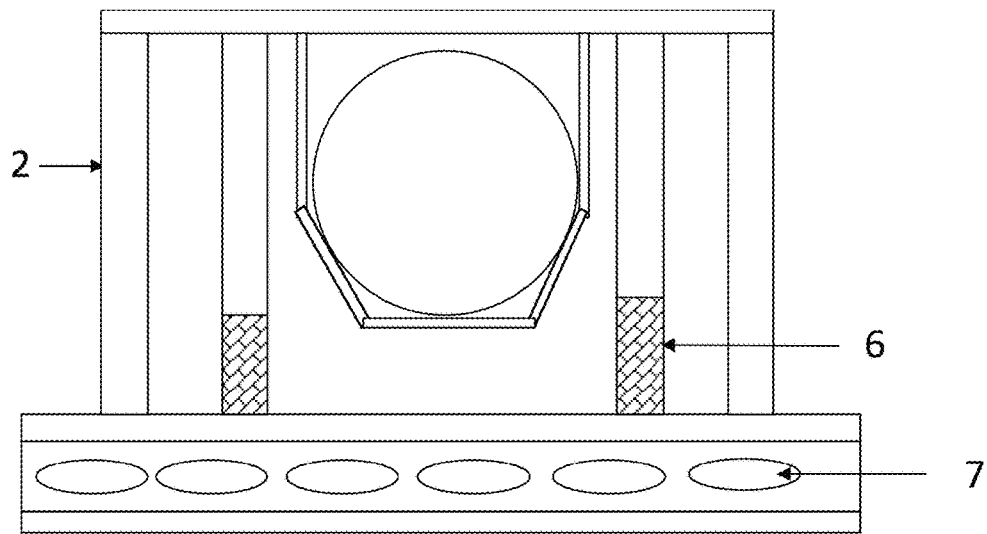
Figure 6C:
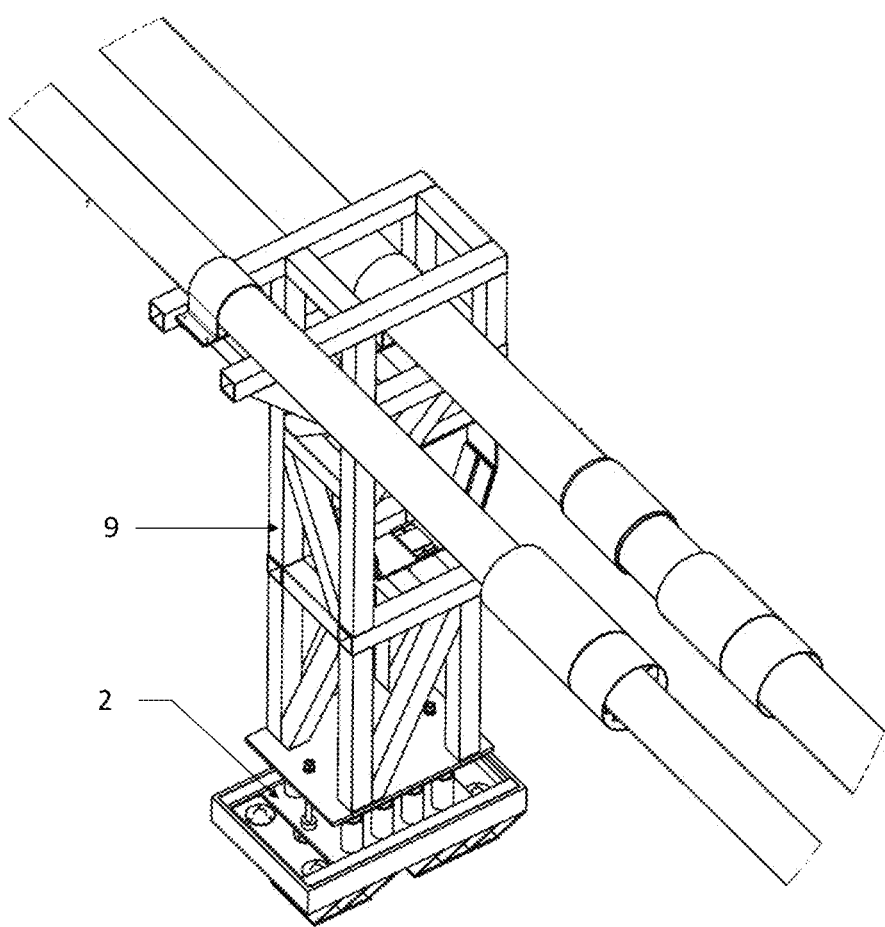
Figure 6D:
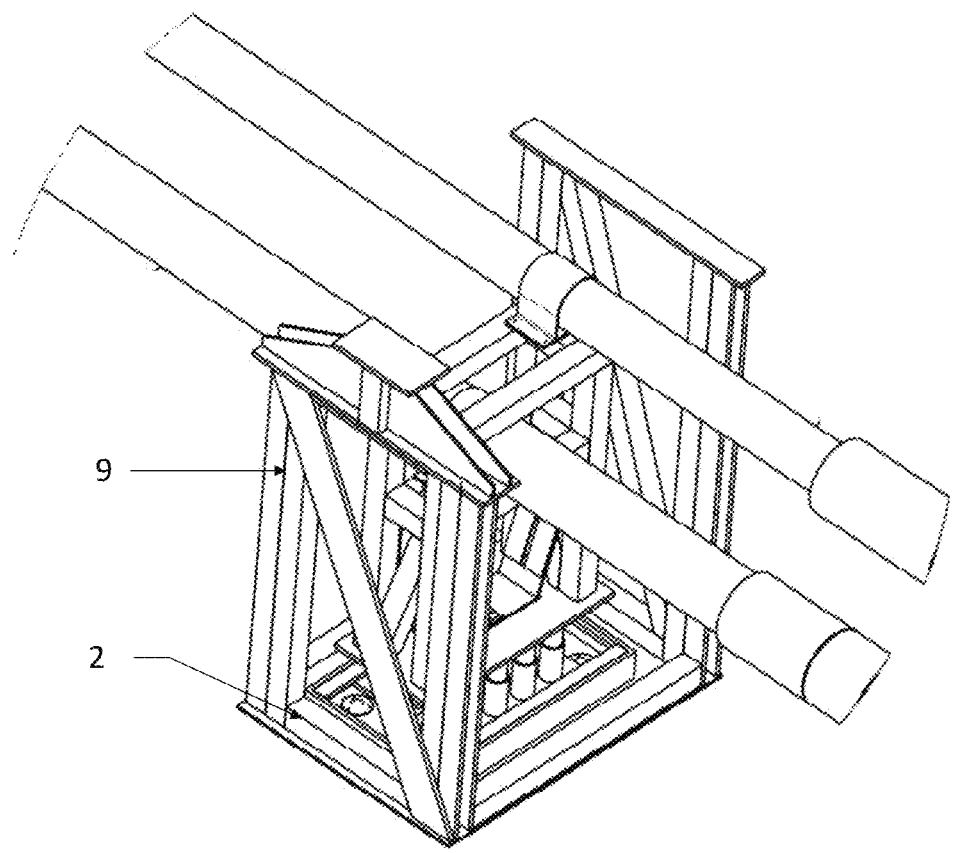

FIGS. 5(a)-(b) illustrate the different embodiments of the external fixed support, according to an implementation of the present invention.

FIGS. 6(a)-(d) illustrate the different embodiments of the external sliding pipe support arrangement, according to an implementation of the present invention.

Figure 7A:
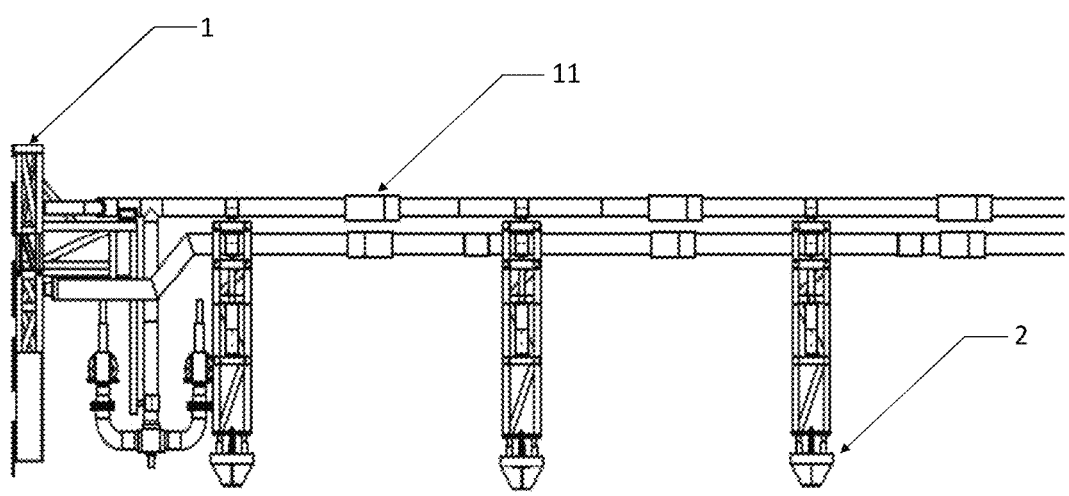
Figure 7B:
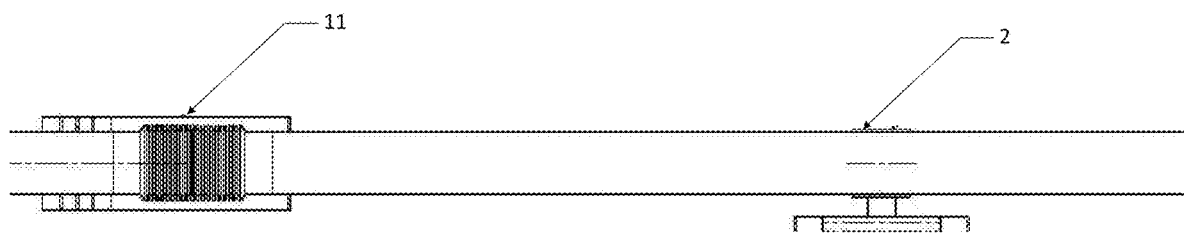

FIG. 7(a)-(b) illustrate the expansion joint location in a piping system for attenuating axial displacement, according to an implementation of the present invention.

FIGS. 8(a)-(i) illustrate the experimental setup and the verification of the functioning of the external fixed support, according to an implementation of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms (including technical and scientific terms) used herein have the same meaning as commonly understood by one of ordinary skill in the art to which various embodiments belong. Further, the meaning of terms or words used in the specification and the claims should not be limited to the literal or commonly employed sense, but should be construed in accordance with the spirit of the disclosure to most properly describe the present disclosure.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

The present disclosure will now be described more fully with reference to the accompanying drawings, in which various embodiments of the present disclosure are shown. The present disclosure may, however, be embodied in many different forms and should not be construed as being limited to the various embodiments set forth herein, rather, these various embodiments are provided so that this disclosure will be thorough and complete, and will fully convey the present disclosure. Furthermore, a detailed description of other parts will not be provided not to make the present disclosure unclear. Like reference numerals in the drawings refer to like elements throughout.

The subject invention lies in providing a sliding pipe supporting arrangement, facilitating displacement decoupling for piping systems for seismic events as per the local geographic conditions. The overall piping system layout along with external fixed supports and the sliding pipe supporting arrangement provides attenuation of the displacement of the piping system in multiple directions, thereby ensuring overall safety.

According to one implementation of the present invention a sliding pipe supporting arrangement (2) adapted to receive and support at least one pipe or pipe assembly, said arrangement comprising main support means (9) comprising at least one opening to support a pipe, an assembly of spring arrangement (6) and ball transfer unit (7), mechanically coupled to the main support means (9) so as to isolate differential displacement in lateral (Y-direction) and vertical direction (Z-direction) of the said pipe, said assembly unit comprising a top plate (3), middle plate (4) and a bottom plate (5), wherein the spring arrangement (6) comprises a plurality of springs substantially positioned in between the top plate (3) and the middle plate (4) facilitating the vertical displacement of the said pipe, and wherein the ball transfer unit (7) comprises plural rollers mechanically positioned between the middle plate (4) and bottom plate (5) facilitating lateral displacement of the said pipe; and an expansion joint arrangement (8) operably placed in between pipe lengths of a pipe to attenuate the axial displacement (X-direction) of the said pipe.

In another embodiment in accordance to the subject matter of the present invention, it provides innovative sliding pipe supporting arrangement for jacketed cryogenic piping system to take care of differential displacement in multiple directions during seismic events.

In another embodiment in accordance to the subject matter of the present invention, the seismic decoupling system as provided by the sliding pipe supporting arrangement of the present invention is designed for vacuum jacketed pipes along with bare pipes. The sliding pipe supporting arrangement attenuates the seismic displacements and the thermal contractions of the cryogenic pipes, thereby ensuring functionality of the cryolines remains intact during and after a seismic event.

In another embodiment in accordance to the subject matter of the present invention, flexibility in a piping system is provided by isolating the differential movement on the pipe itself by incorporating flexible bellows and hoses in the pipes.

In another embodiment in accordance to the subject matter of the present invention, isolating the differential movement of the pipes at the sliding pipe supporting arrangement is implemented by using springs or bearings and the like in the supporting arrangement.

In another embodiment in accordance to the subject matter of the present invention, the displacement decoupling system provided by the sliding pipe supporting arrangement isolates horizontal axial differential movement on the pipe itself using bellows and isolates lateral (horizontal) and vertical differential movement at the sliding external supporting arrangement using rollers and springs respectively. Thus the displacement in all the three directions during a seismic event is isolated or attenuated both in the pipes and in the sliding pipe supporting arrangement.

The external sliding pipe supporting arrangement attenuates or isolates the differential movement in lateral and vertical direction using standard roller bearing and standard springs respectively. The combination of the spring assembly and the ball transfer unit comprising of the rollers, integrated in the supporting structure to support multiple pipes facilitates the attenuation of the displacement encountered by a piping system in multiple directions.

In another embodiment in accordance to the subject matter of the present invention, the supporting arrangement also ensures that cryogenic temperature does not reach to the springs or bearings in case of loss of insulation vacuum in cryolines.

In another embodiment in accordance to the subject matter of the present invention, the displacement of pipes in axial (X direction) is attenuated or isolated by the metallic bellows connecting individual pipe lengths in the entire piping system, of a jacketed cryogenic piping system.

Figure 1:
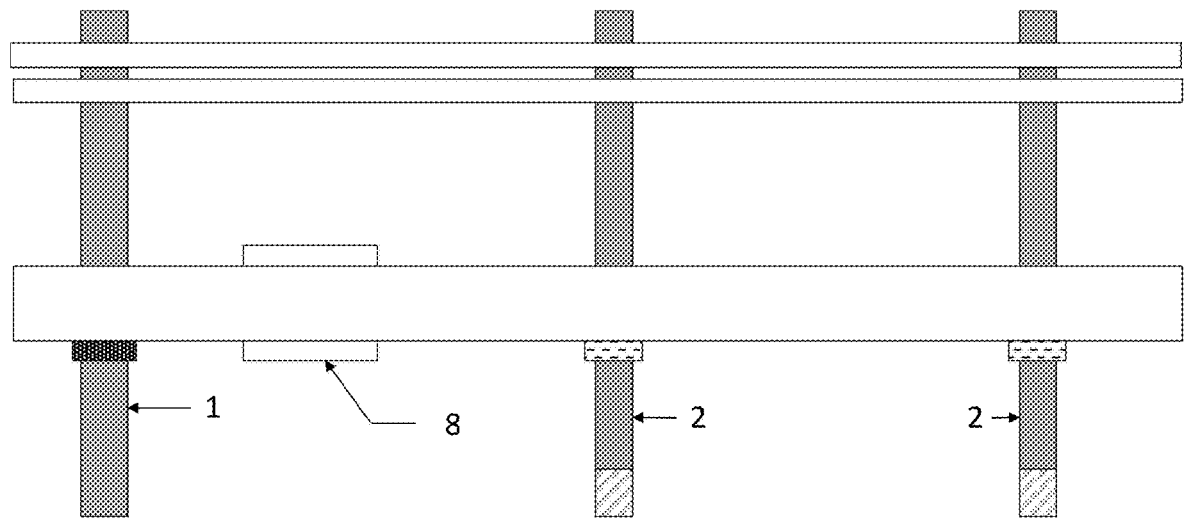
FIG. 1 illustrates a small segment of the piping system with one external fixed support and external sliding support, according to an implementation of the present invention.
Figure 2:
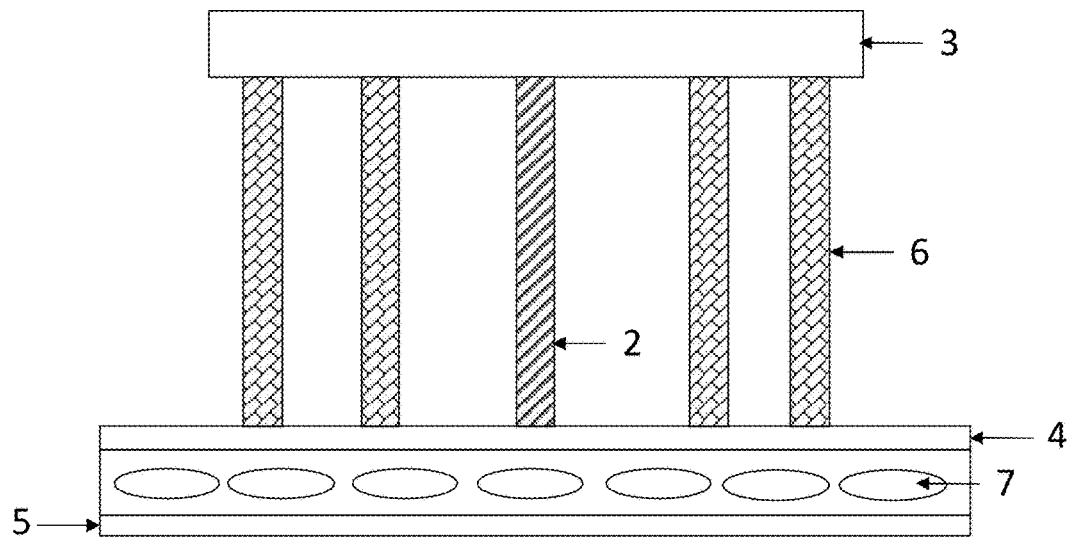
FIG. 2 illustrates an arrangement in a piping system to attenuate lateral and vertical displacement, according to an implementation of the present invention.

Reference has been made to FIGS. 1 and 2, illustrating the pipe supporting arrangement (2) comprising main support frame (9) for pipes, spring arrangement (6) at bottom of the main support frame (9), ball transfer unit comprising roller arrangement (7) below spring arrangement (6) and bottom plate (5) for rigid connection to bridge structure.

Reference has been made to FIG. 5, illustrating different embodiments of the external fixed pipe supporting arrangement of the piping system, adapted to receive plurality of pipes. The fixed support structure (1) has zero degree of freedom and functions as anchor for all pipes. These supporting arrangement (1) is designed to withstand all loads and reactions of the supported pipes.

Reference has been made to FIG. 6, illustrating different embodiments of the sliding pipe arrangement in accordance to the subject matter of the present invention. The main metal frame (9) supports the pipes. The pipes are supported through multiple openings (10). The structural members of these supports are designed so as to function and withstand maximum loading conditions. The lower portion of the supporting arrangement consists of three plates, bottom (5) and middle plates (4) are connected to each other by rollers (7) while middle (4) and upper plate (3) is connected by spring arrangement (6). The different layout of the pipes, along with the layout of the springs and the ball transfer layout has been illustrated. FIGS. 6(a)-(b) illustrate external sliding pipe supporting arrangement providing displacement decoupling facility by attenuating or isolating axial, lateral and vertical displacement. FIGS. 6(c)-(d) illustrate external sliding pipe supporting arrangement providing displacement decoupling facility by attenuating or isolating axial and lateral displacement.

In another embodiment in accordance to the subject matter of the present invention, the sliding pipe supporting arrangement for jacketed cryogenic piping system isolates or attenuates differential displacement in multiple directions. The design of sliding piping supporting arrangement provides for isolation of lateral (horizontal) and vertical differential movements during SL-2 type seismic event (max. acceleration of 8.6 G vertically, 2.1 G and 5 G in horizontal directions). The support is common for two vacuum jacketed cryolines and one bare pipe. The supporting arrangement (2) is designed to minimize its moments at the centre of gravity. Further, the supporting arrangement (2) also sustains accidental case of "loss of insulation vacuum of one cryoline" where the outer jacket pipe temperature of the cryoline can decrease locally up to −172° C., thereby achieving seismic-safe piping systems.

Figure 3:
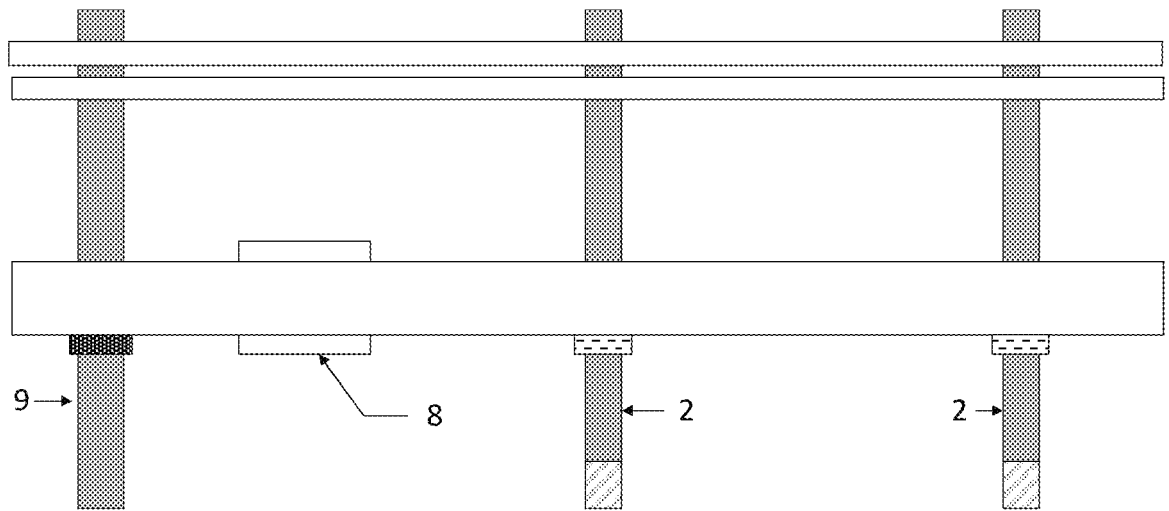
FIG. 3 illustrates an arrangement in a piping system to attenuate axial displacement, according to an implementation of the present invention.
Figure 4:
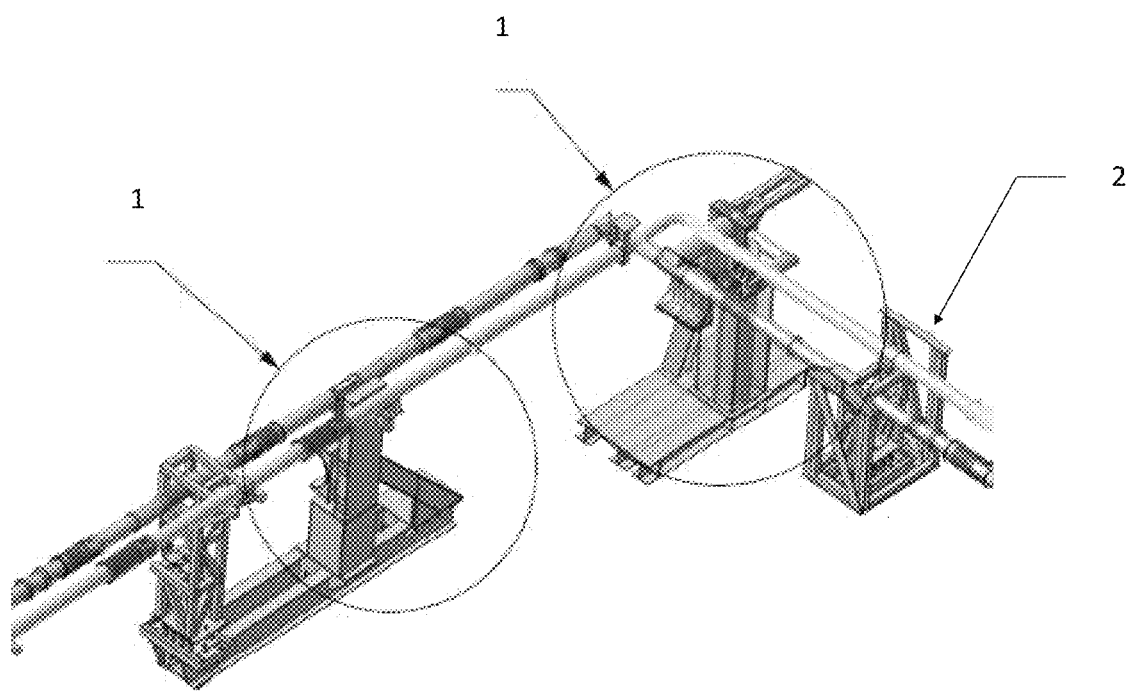
FIG. 4 illustrates a model of the support arrangement in a piping system, according to an implementation of the present invention.

Referring to FIG. 3, expansion joint arrangement like bellows (8) are used between two pipe segments to isolate axial displacements. Local support of each line has been designed to slide axially. Since magnitude of axial displacement is large and coupled with the thermal contraction, multiple bellows in series compensate the total axial displacement of the piping system.

In another embodiment in accordance to the subject matter of the present invention, reference has been made to FIG. 7, illustrating the sliding support arrangement and the bellows arrangement for thermal compensation of process pipe. For thermal compensation, flexible hoses are used and bellows for process pipe have been used to isolate the thermal contraction and differential displacement as well. External bellows for Outer Vacuum Jacket (OVJ) isolate or attenuate differential displacements and contraction in case of loss of insulation vacuum for vacuum jacketed Group Y cryolines. External bellows for OVJ are placed in series between two fixed supports. Bellows on outer vacuum jacket as well as on non-vacuum jacketed lines with external sleeve are provided to prevent lateral displacement as well as lateral load on bellows.

Figure 8A:
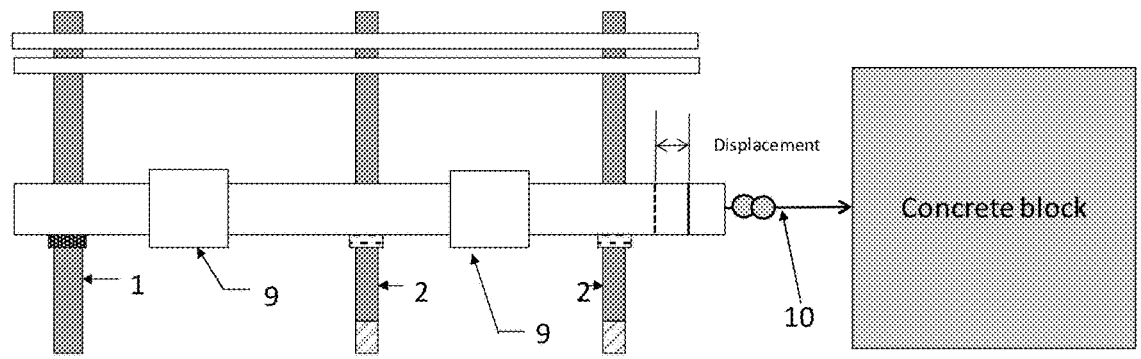
Figure 8B:
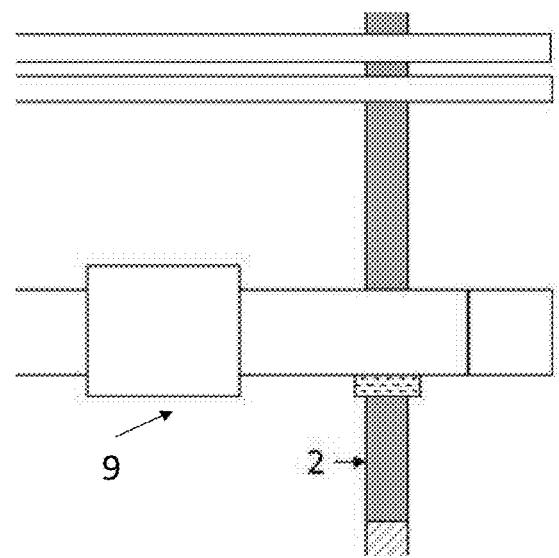
Figure 8C:
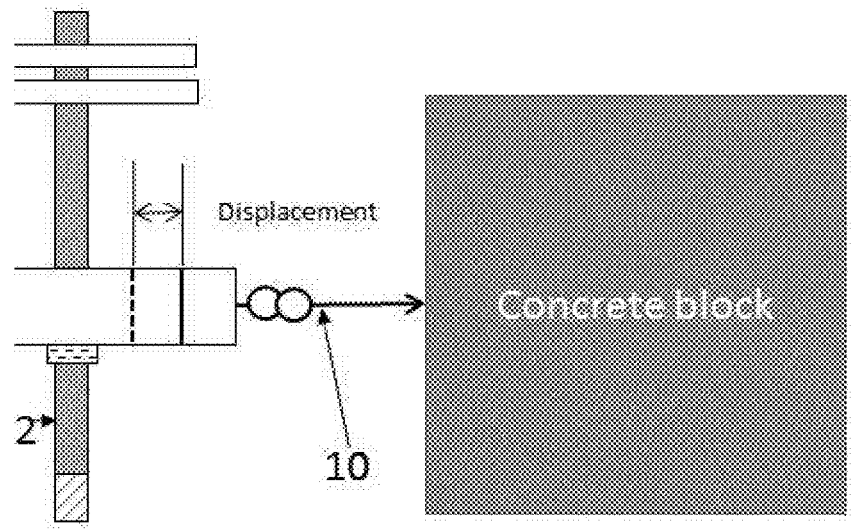
Figure 8D:
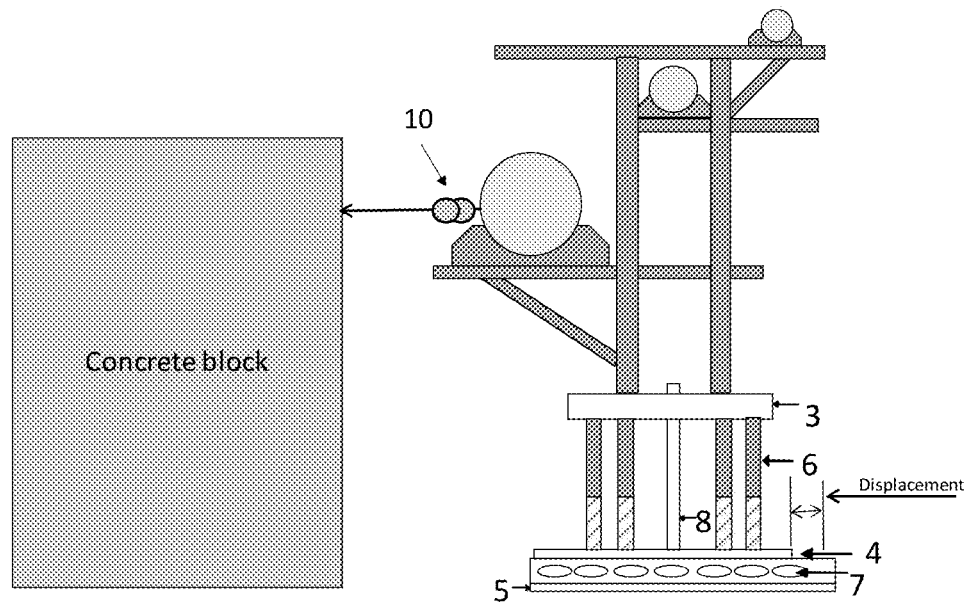
Figure 8E:
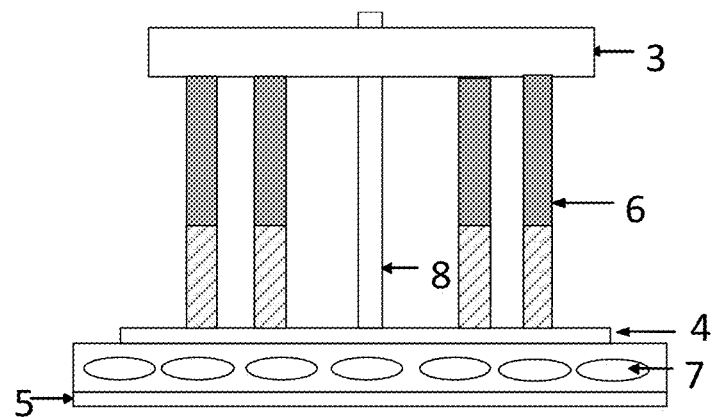
Figure 8F:
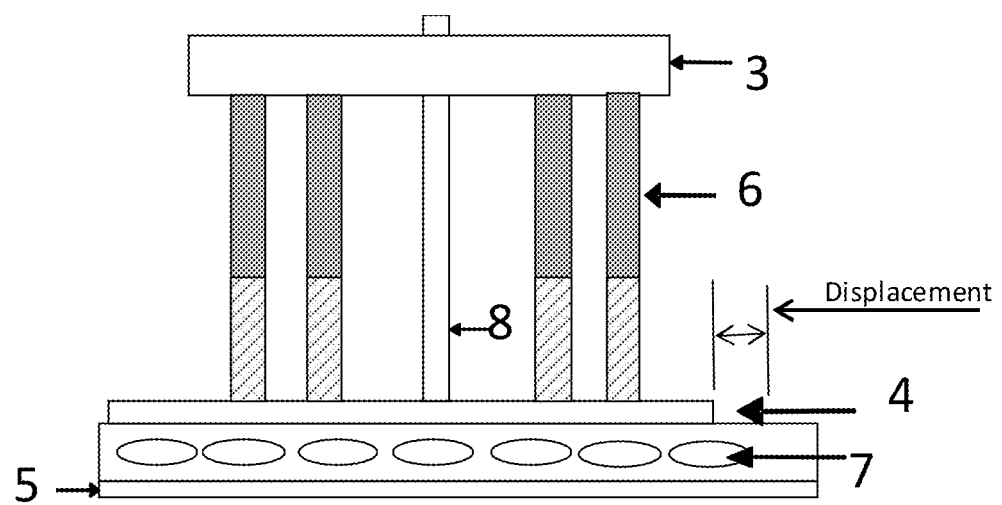
Figure 8G:
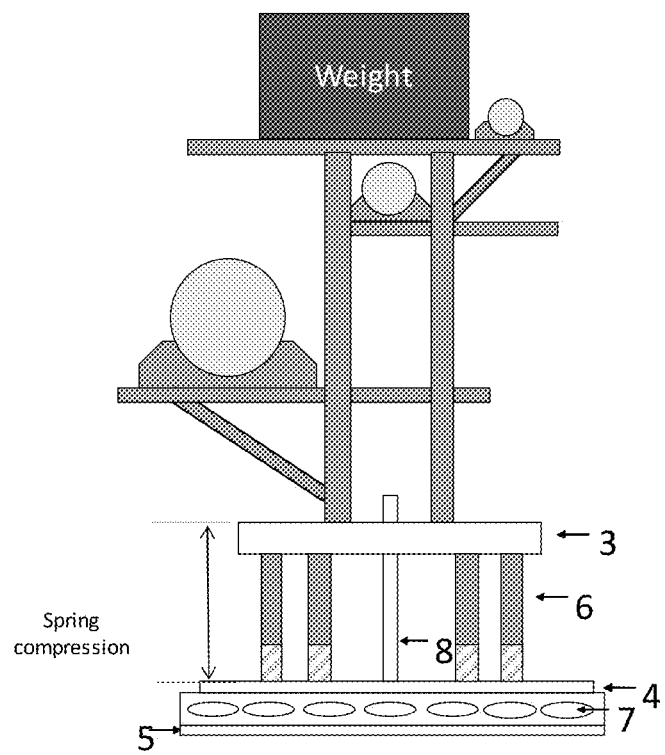
Figure 8H:
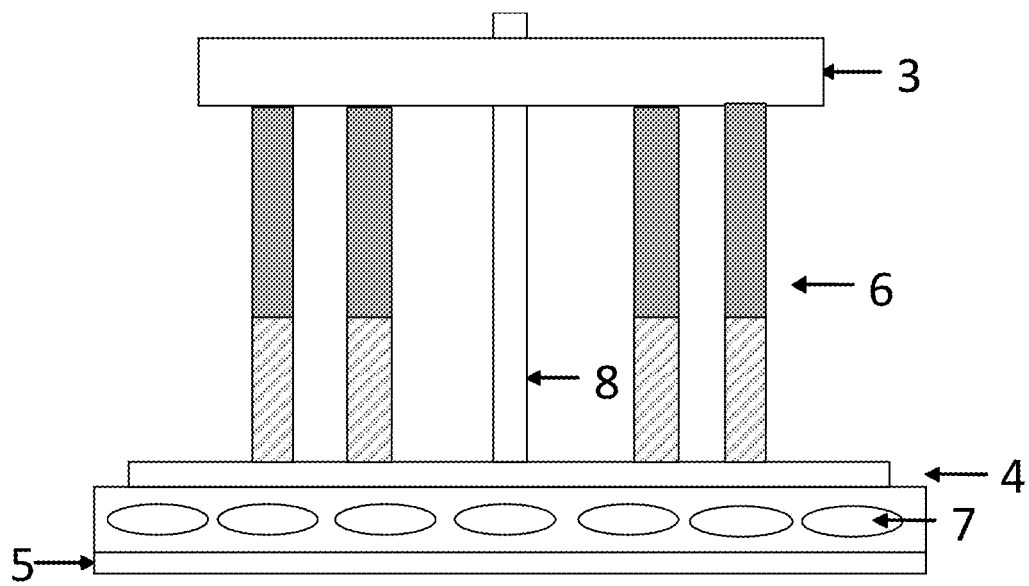
Figure 8I:
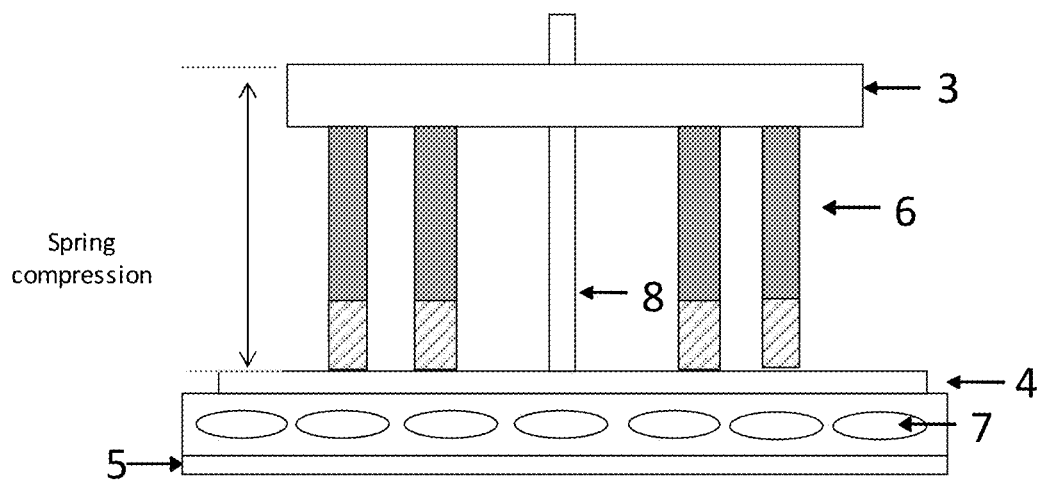

Reference has been made to FIGS. 8(a)-(i), illustrating the experimental setup and the verifying the functioning of the displacement decoupling provided by the external sliding pipe supporting arrangement under applied force (by using turnbuckle or weight) in each direction. To check axial movement turnbuckle has been placed along the line axis. Axial force has been applied on line by means of attaching a turnbuckle as shown in FIG. 8(a). Initial reading with reference to datum consideration has been recorded as in FIG. 8(b). Final reading after applying the axial force has been recorded as shown in FIG. 8(c). For lateral movement turnbuckle has been placed perpendicular to the line axis. Lateral force has been applied on line by means of attaching the turnbuckle as shown in FIG. 8(d). Initial and final reading with reference to datum consideration has been recorded as in FIGS. 8(e)-(f). To check vertical movement vertical force has been applied on sliding support by means of external weight as shown in FIG. 8(g). Displacement value for after compression of springs has been recorded as shown in FIG. 8(i).

The supporting arrangement (2) is designed to take care of maximum differential displacements of ±153 mm in lateral and ±56 mm in vertical direction. The tests have been performed and Table-1 shows the results obtained from this tests.

| Sr. No. | Direction | Initial Reading (mm) | Final Reading (mm) | Differential displacement (mm) | Method of Force applied |
|---|---|---|---|---|---|
| 1 | Axial | 50 | 85 | 35 | By means of turnbuckle |
| 2 | Lateral | 50 | 125 | 75 | By means of turnbuckle |
| 3 | Vertical | 315 | 305 | 10 | By means of external weight |

The test setup of displacement decoupling has been fabricated and successfully tested. External force in each direction has been applied and it has been checked that displacement decoupling system containing ball transfer units, springs and bellows is able to absorb the displacement without damaging or failure of the lines.

Some of the non-limiting advantages of the present invention are:
1. Helps to achieve safe design of piping system (in particular cryogenic jacketed piping) under severe seismic conditions by decoupling the differential displacements in multiple directions.

2. Attenuating displacement of pipes under seismic conditions in all 3 directions (X, Y and Z) including combination of such displacements, thereby improving sustainability of pipelines in seismic regions.

Although a sliding pipe supporting arrangement adapted to receive and support at least one pipe or pipe assembly has been described in language specific to structural features, it is to be understood that the embodiments disclosed in the above section are not necessarily limited to the specific methods or devices described herein. Rather, the specific features are disclosed as examples of implementations of a sliding pipe supporting arrangement adapted to receive and support at least one pipe or pipe assembly.

We claim:

1. A sliding pipe supporting arrangement (2) adapted to receive and support at least one pipe or jacketed pipe assembly, said arrangement comprising
   main support means (9) comprising at least one opening to support a pipe;
   an assembly of spring arrangement (6) and ball transfer unit (7), mechanically coupled to the main support means (9) so as to isolate differential displacement in lateral (Y-direction) and vertical direction (Z-direction) of the said pipe, said assembly unit comprising a top plate (3), middle plate (4) and a bottom plate (5), wherein the spring arrangement (6) comprises a plurality of springs substantially positioned in between the top plate (3) and the middle plate (4) facilitating the vertical displacement of the said pipe, and wherein the ball transfer unit (7) comprises plural rollers mechanically positioned between the middle plate (4) and bottom plate (5) facilitating lateral displacement of the said pipe; and
   an expansion joint arrangement (8) operably placed in between pipe lengths of a pipe to attenuate the axial displacement (X-direction) of the said pipe.

2. A piping system for jacketed cryogenic piping arrangement comprising
   a sliding pipe supporting arrangement (2) adapted to receive and support at least one pipe or jacketed pipe assembly, said arrangement comprising
      main support means (9) comprising at least one opening to support a pipe;
      an assembly of spring arrangement (6) and ball transfer unit (7), mechanically coupled to the main support means (9) so as to isolate differential displacement in lateral (Y-direction) and vertical direction (Z-direction) of the said pipe, said assembly unit comprising a top plate (3), middle plate (4) and a bottom plate (5), wherein the spring arrangement (6) comprises a plurality of springs substantially positioned in between the top plate (3) and the middle plate (4) facilitating the vertical displacement of the said pipe, and wherein the ball transfer unit (7) comprises plural rollers mechanically positioned between the middle plate (4) and bottom plate (5) facilitating lateral displacement of the said pipe;
      an expansion joint arrangement (8) operably placed in between pipe lengths of a pipe to attenuate the axial displacement (X-direction) of the said pipe; and
   a fixed pipe supporting arrangement (1), adapted to receive and support a plurality of vacuum jacketed cryolines and a bare pipe.

3. The piping system as claimed in claim 2, wherein the sliding pipe supporting arrangement (2) operates at very low temperatures, where outer jacket pipe temperature of the cryoline decrease up to approximately −172° C. due to loss of insulation vacuum of the said cryoline.

4. The piping system as claimed in claim 2, wherein the sliding pipe supporting arrangement (2) operates under SL-2 type seismic event, having an acceleration of 8.6G in the vertical direction (Z-direction), 2.1G and 5G in the horizontal direction (X and Y directions).

* * * * *